US012503906B2

(12) United States Patent
Woodward et al.

(10) Patent No.: US 12,503,906 B2
(45) Date of Patent: Dec. 23, 2025

(54) FENESTRATION FRAME INSULATION FITTINGS AND METHODS FOR SAME

(71) Applicant: Marvin Lumber and Cedar Company, LLC, Eagan, MN (US)

(72) Inventors: Bradley David Woodward, Warroad, MN (US); Chris Ylitalo, Warroad, MN (US); Kyle C. Koch, Warroad, MN (US)

(73) Assignee: Marvin Lumber and Cedar Company, LLC, Eagan, MN (US)

( * ) Notice: Subject to any disclaimer, the term of this patent is extended or adjusted under 35 U.S.C. 154(b) by 701 days.

(21) Appl. No.: 17/648,649

(22) Filed: Jan. 21, 2022

(65) Prior Publication Data

US 2023/0235614 A1 Jul. 27, 2023

(51) Int. Cl.
*E06B 3/263* (2006.01)
*E05B 63/08* (2006.01)
(Continued)

(52) U.S. Cl.
CPC .............. *E06B 3/2632* (2013.01); *E05C 9/22* (2013.01); *E06B 3/28* (2013.01); *E05B 63/08* (2013.01);
(Continued)

(58) Field of Classification Search
CPC .......... E06B 3/263; E06B 3/2632; E06B 3/28; E06B 2003/26321; E06B 2003/26325;
(Continued)

(56) References Cited

U.S. PATENT DOCUMENTS 4,624,091 A * 11/1986 Biro ....................... E06B 3/5821 52/204.593
4,993,204 A * 2/1991 Kuritsky ................. E04C 2/384 52/656.2
(Continued)

FOREIGN PATENT DOCUMENTS

CA 3057928 C 10/2023
DE 2010441 A1 * 10/1971
(Continued)

OTHER PUBLICATIONS

Machine translation for DE2010441 via Espacenet [2024].*
(Continued)

*Primary Examiner* — Christine T Cajilig
(74) *Attorney, Agent, or Firm* — Schwegman Lundberg & Woessner, P.A.

(57) ABSTRACT

A fenestration assembly includes a fenestration frame having a frame core. The frame core includes a core exterior face and a a core interior face. A core wall of the frame core includes filament reinforced polymer, and the core wall extends between the core exterior face and the core interior face. One or more core cavities are within the frame core and surrounded by the core wall. At least one insulation scaffold is seated within the one or more cavities. The insulation scaffold includes one or more scaffold walls and scaffold cavities bordered by the one or more scaffold walls. Engagement feet are coupled with the remainder of the insulation scaffold, and the engagement feet are engaged against the core wall.

28 Claims, 10 Drawing Sheets

(51) Int. Cl.

| | |
|---|---|
| ***E05C 9/04*** | (2006.01) |
| ***E05C 9/22*** | (2006.01) |
| ***E06B 3/28*** | (2006.01) |

(52) U.S. Cl.
CPC ....... *E05C 9/04* (2013.01); *E06B 2003/26321* (2013.01); *E06B 2003/26361* (2013.01); *E06B 2003/26369* (2013.01); *E06B 2003/2639* (2013.01)

(58) Field of Classification Search
CPC . E06B 2003/26361; E06B 2003/26369; E06B 2003/2639; E05C 9/04; E05C 9/22
See application file for complete search history.

(56) References Cited

U.S. PATENT DOCUMENTS

| | | | |
|---|---|---|---|
| 5,713,167 A | 2/1998 | Durham et al. | |
| 7,520,093 B2 | 4/2009 | Guhl | |
| 7,748,194 B2 * | 7/2010 | Carless | E06B 3/9642 403/231 |
| 8,617,702 B2 | 12/2013 | Jha et al. | |
| 8,997,412 B1 | 4/2015 | Header | |
| 9,127,498 B1 | 9/2015 | Ye | |
| 9,683,402 B2 | 6/2017 | Abdul Lathief | |
| 10,107,027 B1 | 10/2018 | Weavers et al. | |
| 11,136,816 B2 | 10/2021 | Woodward et al. | |
| 11,598,142 B2 | 3/2023 | Woodward et al. | |
| 2003/0217514 A1 * | 11/2003 | Sherrett | E06B 3/44 49/445 |
| 2009/0277093 A1 * | 11/2009 | Over | E06B 3/68 49/400 |
| 2010/0018140 A1 * | 1/2010 | Brunnhofer | E06B 3/26303 52/717.05 |
| 2014/0053488 A1 * | 2/2014 | Lenox | E06B 3/34 49/404 |
| 2017/0240738 A1 | 8/2017 | Ehrlichmann et al. | |
| 2018/0179805 A1 * | 6/2018 | Niehausmeier | E05C 1/00 |
| 2020/0109595 A1 * | 4/2020 | Woodward | E06B 3/6715 |
| 2022/0065028 A1 | 3/2022 | Woodward et al. | |

FOREIGN PATENT DOCUMENTS

| | | | |
|---|---|---|---|
| DE | 3231876 A1 * | 3/1984 | |
| DE | 10033389 | 1/2002 | |
| EP | 1457637 A2 * | 9/2004 | E05C 9/1808 |
| EP | 3133229 A1 * | 2/2017 | E05B 15/021 |
| GB | 2434395 A * | 7/2007 | E06B 3/2632 |
| KR | 20210146617 A | 12/2021 | |

OTHER PUBLICATIONS

"U.S. Appl. No. 16/596,702, Non Final Office Action mailed Nov. 12, 2020", 7 pgs.
"U.S. Appl. No. 16/596,702, Response filed Mar. 12, 2021 to Non Final Office Action mailed Nov. 12, 2020", 14 pgs.
"U.S. Appl. No. 16/596,702, Examiner Interview Summary mailed Mar. 16, 2021", 2 pgs.
"U.S. Appl. No. 16/596,702, Notice of Allowance mailed Jun. 4, 2021", 7 pgs.
"Canadian Application Serial No. 3,057,928, Office Action mailed Dec. 8, 2021", 3 pgs.
"Canadian Application Serial No. 3,057,928, Response Filed Apr. 6, 2022 to Office Action mailed Dec. 8, 2021", 82 pgs.
"U.S. Appl. No. 17/447,255, Non Final Office Action mailed Aug. 30, 2022", 9 pgs.
"U.S. Appl. No. 17/447,255, Response filed Oct. 7, 2022 to Non Final Office Action mailed Aug. 30, 2022", 8 pgs.
"U.S. Appl. No. 17/447,255, Notice of Allowance mailed Oct. 27, 2022", 5 pgs.
"Canadian Application Serial No. 3,057,928, Voluntary Amendment Filed Dec. 30, 2022", 11 pgs.
"U.S. Appl. No. 17/447,255, PTO Response to Rule 312 Communication mailed Feb. 6, 2023", 2 pgs.
"Canadian Application Serial No. 3,057,928, Office Action mailed Feb. 13, 2023", 3 pgs.
"Canadian Application Serial No. 3,057,928, Response Filed Apr. 12, 2023 to Office Action mailed Feb. 13, 2023", 22 pgs.
"Canadian Application Serial No. 3,186,159, Examiners Rule 86(2) Report mailed Jun. 18, 2024", 5 pgs.
"Canadian Application Serial No. 3,186,159, Response filed Oct. 7, 2024 to Examiners Rule 86(2) Report mailed Jun. 18, 2024", 49 pgs.
"Canadian Application Serial No. 3,186,159, Examiners Rule 86(2) Report mailed Jul. 3, 2025", 6 pgs.
"Canadian Application Serial No. 3,186,159, Response filed Nov. 3, 2025 to Examiners Rule 86(2) Report mailed Jul. 3, 2025", w English Claims, 18 pgs.

* cited by examiner

FENESTRATION FRAME INSULATION FITTINGS AND METHODS FOR SAME

RELATED APPLICATIONS

This application is related to U.S. application Ser. No. 16/596,702, filed Oct. 8, 2019, the disclosure of which is incorporated herein in its entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the data and drawings that form a part of this document: Copyright Marvin Lumber and Cedar Company, LLC (d/b/a Marvin Windows and Doors); Warroad, Minn. All Rights Reserved.

TECHNICAL FIELD

This document pertains generally, but not by way of limitation, to fenestration assemblies and lineal components of fenestration assemblies.

BACKGROUND

Fenestration assemblies including window and door fenestration assemblies include one or more frames. For instance, double hung and door fenestration assemblies include panels (e.g., sashes or doors) movably coupled with a peripheral frame. In at least some examples, each of the panels includes its own frame coupled with a glazing unit, such as a pane of glass.

Some examples of fenestration assemblies include frames constructed with aluminum, steel or the like. For instance, lineal aluminum or steel components are cut to length and assembled to form the frame. In other examples, the frames are constructed with vinyl or polyethylene. In a similar manner to metal components, lineal vinyl or polyethylene are cut to length and assembled to form the frame.

OVERVIEW

The present inventors have recognized, among other things, that a problem to be solved includes enhancing thermal insulating properties of fenestration assemblies. Fenestration assemblies including composite frames (e.g., extruded or pultruded fame members optionally including filaments, such as metal or glass fibers) are robust assemblies that are resistant to warping, fatigue or the like. Accordingly, composite frames are durable and well suited for large fenestration assemblies including windows and doors that warrant additional rigidity to resist warping or fatigue. In extreme temperatures (e.g., summer, winter or other non-seasonal temperature extremes) the composite frames even with enhanced thermal values (e.g., heat transfer coefficients (U), higher thermal conductivities (κ) or the like) are subject to heat transfer between the frame interior and exterior portions. For instance, cavities within the frame members are air filled and facilitate limited heat transfer including convection, radiation or the like.

Optionally, insulating foam, fillers or the like are provided within cavities of the frames to minimize heat transfer through the cavities. The foam or fillers are positioned within the cavities and fill portions of the cavities while the cavity itself is at least partially unbroken. For instance, air in the cavity extends between interior and exterior adjacent portions of the frame. In one example, during the winter the warm interior face of the frame is proximate to an air filled cavity of the frame. The air in the cavity receives heat from the interior face of the frame, and the heated air moves by convection toward the cooler exterior face of the frame. Additionally, heat is radiated from the interior of the frame to the exterior of the frame across the cavity having the foam or filler in some examples (e.g., across gaps between the cavity sidewalk and the foam or filler). Heat is accordingly lost through the exterior face of the frame by way of convection, radiation or both. In summer months, with a heated exterior and cooled interior these types of heat transfer are reversed.

In other examples, polymer windows, such as vinyl windows are extruded or pultruded. Because polymers (e.g., without fillers, such as a glass fibers) are readily extruded or pultruded the dies include features to coextrude (or pultrude) intermediate walls, septums or the like to interrupt cavities between the interior and exterior faces of the frame. In contrast, composite frame members, for instance including polymers and filaments, fibers or the like (such as glass), are difficult to extrude or pultrude with intervening walls, septums or the like. The polymer and filament mixture is formed during extrusion or pultrusion into frame members having a cavity, however in some examples the inclusion of (extruded or pultruded) walls or septums to subdivide one or more cavities is difficult. For instance, in examples the molten polymer with filament additives does not reliably flow into gaps in dies that form intervening walls or septums.

The present subject matter helps provide a solution to these problems with a fenestration assembly including a fenestration frame having a frame core constructed with a composite material and an insulation scaffold coupled with the frame core, and the insulation scaffold partitions one or more cavities of the frame core into isolated scaffold cavities. The insulation scaffold isolates each of the interior portions of the frame core from the exterior portions of the frame core with the scaffold cavities that minimize each of convective and radiative heat transfer.

The insulation scaffold includes scaffold walls and one or more engagement feet. The insulation scaffold is installed within a frame cavity of the frame core of the fenestration frame. The engagement fee couple the insulation scaffold with the core wall of the frame core, and the one or more scaffold walls of the insulation scaffold span the frame cavity. The insulation scaffold including the one or more scaffold walls divides or partitions the frame cavity into two or more scaffold cavities. In one example the one or more scaffold walls extend laterally across the frame cavity (e.g., extend laterally relative to the core exterior and core interior faces) and accordingly divide the frame cavity into the two or more scaffold cavities interposed between the core exterior and core interior faces. The scaffold cavities and one or more scaffold walls of the insulation scaffold interrupt or throttle heat transfer between the core interior and core exterior faces of the fenestration frame, and thereby thermally isolate the interior and exterior of the frame from each other. The frame core itself throttles conductive heat transfer because of the minimal profile (e.g., thickness and contour) and materials of the frame core, and the insulation scaffold further enhances insulation of the fenestration assembly by throttling convective and radiative heat transfer across the frame cavities.

Because the frame core includes a polymer and filaments it is difficult in some examples to extrude or pultrude interposing walls between the core exterior and core interior faces. The insulation scaffolds discussed herein include scaffold profiles that are, in some examples, difficult to mold (e.g., mold, extrude, pultrude or the like) with the frame material. For instance one or more scaffold walls, thicknesses of the same, engagement feet, biasing elements (discussed herein) or the like are provided with the insulation scaffold. The insulation scaffold is distinct from the fenestration frame, and installed to the fenestration frame. For example, the insulation scaffold is slidably delivered into a frame cavity of the frame core, and the engagement feet couple the scaffold along the core wall of the frame core. The engagement feet retain the insulation scaffold in a specified orientation within the frame core, for instance by way of a friction, an interference fit, complementary coupling features (e.g., foot recesses and ridges) provided with the frame core or the like. The insulation scaffold thereby orients the one or more scaffold walls with the frame core of the fenestration assembly to isolate the core exterior and core interior faces.

In other examples, insulation scaffold profiles correspond to frame cores having a plurality of frame cavities and associated cavity profiles of the surrounding core walls. For instance, the one or more scaffold walls, engagement feet, and optionally the associated core walls surrounding a frame cavity have complementary profiles to each other to facilitate the installation of specified insulation scaffolds that throttle heat transfer across the frame cavities. In still other examples, the insulation scaffolds are installed in frame cavities that otherwise permit appreciable heat transfer in comparison to other cavities. The remaining cavities are optionally filled with foam insulation blocks, foam insulation or alternative insulation scaffolds (e.g., with fewer scaffold walls and associated scaffold cavities) or the like.

In still other examples, the insulation scaffolds are constructed with materials that throttle conductive heat transfer, like polymers, glass or the like. Additionally, the profile of the scaffolds includes relatively narrow profile scaffold walls that throttle heat transfer through the walls. The engagement feet further minimize conductive heat transfer by engaging the frame core with edge or linear contact (e.g., in contrast to surface to surface contact).

Optionally, the insulation scaffold is seated within the fenestration frame and provides a component that supports other fenestration features, including but not limited to, tie bars, shoot bolts, wiring or the like. In an example including shoot bolts (e.g., tie bars, latch bolts or the like) extending remotely relative to fenestration operation hardware, the insulation scaffold includes a hardware guide that guides movement of the shoot bolts and at the same time constrains unspecified movement (e.g., buckling, lateral movement relative to an actuating axis).

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
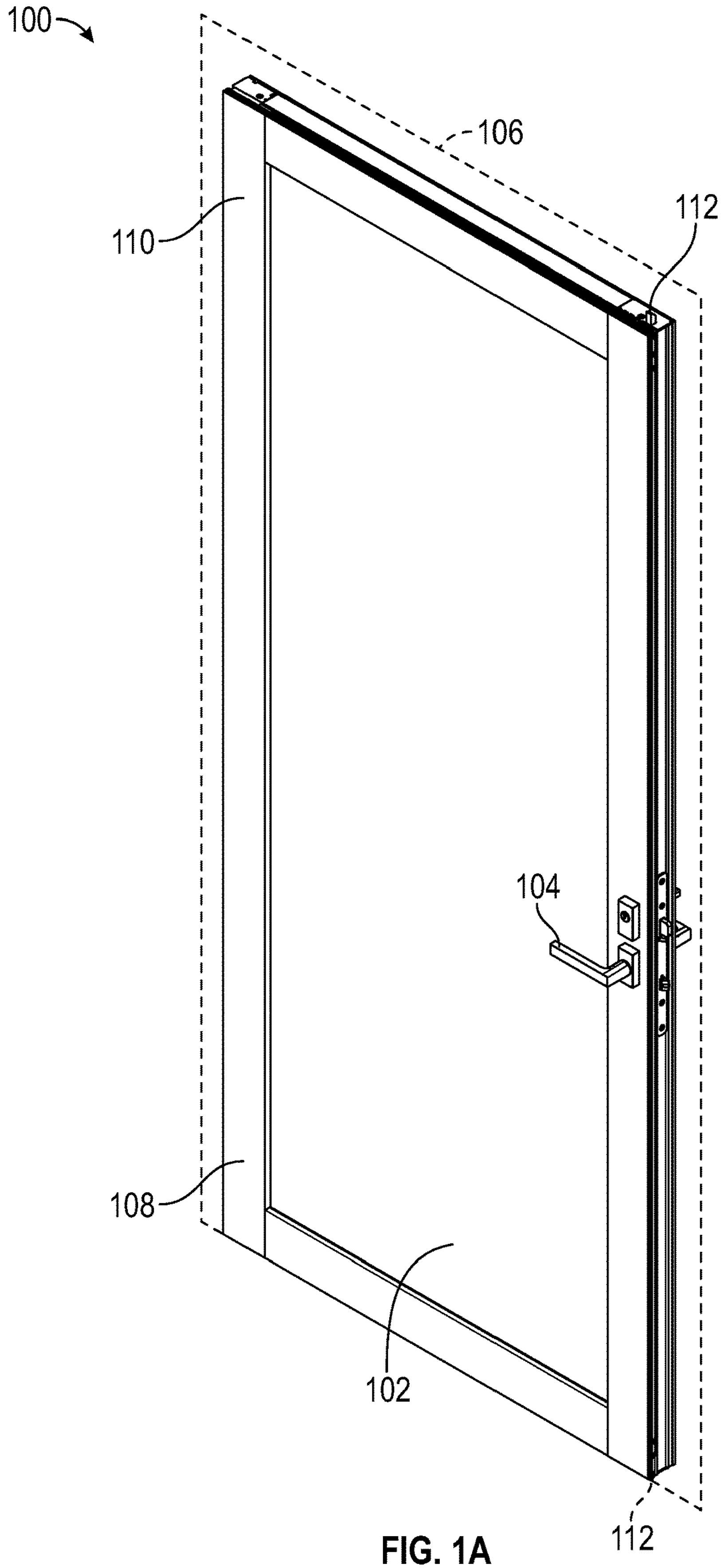
FIG. 1A is a perspective view of one example of a fenestration assembly.
Figure 1B:
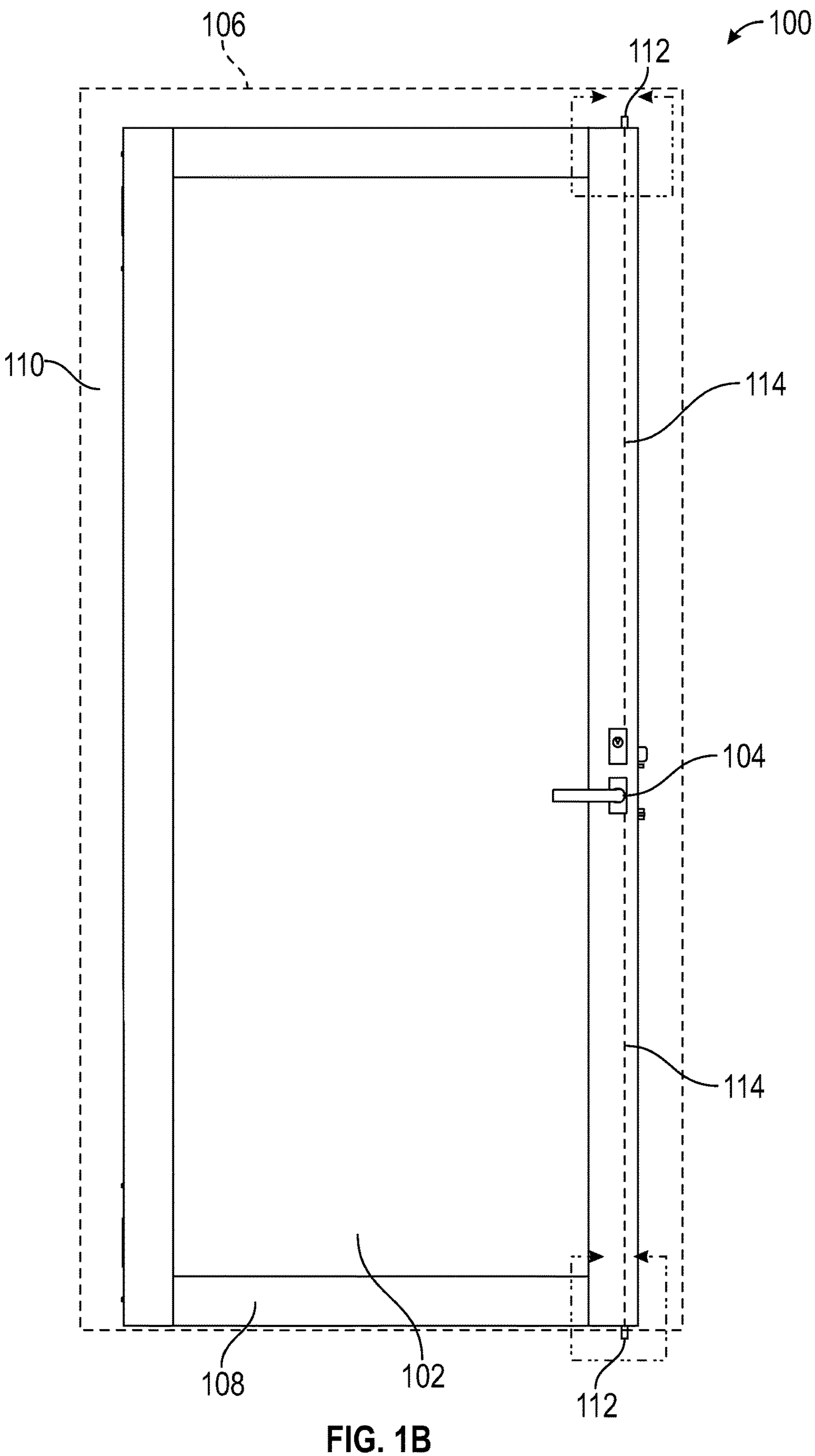
FIG. 1B is a front view of the fenestration assembly of FIG. 1A.

FIG. 1A is a perspective view of one example of a fenestration assembly 100. FIG. 1B is a front view of the fenestration assembly 100. In this example, the fenestration assembly 100 includes a door assembly having an operable panel, such as the fenestration panel 108. The fenestration assembly 100, in this example, is a door assembly. In other examples, the fenestration assembly 100 includes, but is not limited to window assemblies, door assemblies or the like having a moveable or stationary sash or panel. In one example, the panel 108 is a swinging door such as that shown with the assembly provided in FIG. 1A or alternatively as a casement window, awning window or the like. In other examples, the panel 108 moves translationally within a peripheral frame 106 of the assembly 100, for instance, in the manner of a single or double hung window. The fenestration assembly 100 shown in FIGS. 1A, B includes the panel 108 having a glazing unit 102 therein.

Referring again to FIG. 1A, the fenestration assembly 100 includes a peripheral frame 106 and the panel 108 having a fenestration frame 110 (e.g., panel frame) and in this example the glazing unit 102 coupled with the fenestration frame 110. The peripheral frame 106 couples with the fenestration panel 108, and in various examples hinges, channels, latches or the like are provided between the peripheral frame 106 and the panel 108 to permit movement of the panel relative to the peripheral frame 106. In the example shown in FIGS. 1A and 1B the fenestration assembly includes operation hardware 104 including a handle, hardware mechanism or the like coupled with one or more latch bolts. Actuation of the operation hardware 104 latches and unlatches the panel 108 from the peripheral frame to permit movement of the panel. In one example, the operation hardware 104 is coupled with shoot bolts 112 (e.g., also referred to as latch bolts, shoot bolt tips, latch bolt tips or the like) remotely positioned relative to the operation hardware 104, for instance proximate to the header or sill of the assembly 100. As shown in broken lines in FIG. 1B connecting rods 114 interconnect the shoot bolts 112 with the operation hardware 104 to facilitate actuation of the shoot bolts 112 Optionally the connecting rods 114 are integral to the shoot bolts 112. As described herein, the shoot bolts 112, connecting rods 114 or the like are fenestration hardware components that are guided, supported or both by hardware guides provided with the insulation scaffolds.

One or more of the fenestration frame 110 or peripheral frame 106 includes a frame core as discussed herein. In various examples, the frame core includes a lineal component such as an extruded or pultruded component having a core wall extending continuously between interior and exterior portions of the fenestration frame 110, peripheral frame 106, panel 108 or fenestration assembly 100.

The frame core (207 in FIGS. 2 and 3) includes features that throttle heat transfer including, but not limited to, tortuous core walls, narrow core walls, core cavities (voids), foam, foam blocks, insulation scaffolds as described herein or the like. The direction and control of heat transfer through the frame core 104 throttles heat transfer between the exterior and interior portions of the fenestration assembly 100 and enhances one or more thermal characteristics of the assembly (e.g., U values, R values or the like).

As described herein, the frame core, in one example, is constructed with a polymer having one or more types of filaments. For instance, in one example, the frame core 207 includes a monomer resin such as a urethane resin having glass filaments or fibers included therein. The combination of polymer (e.g., polyurethane) and filaments (e.g., glass filaments) facilitates the production of a frame core having a narrow wall profile that also provides robust structural integrity to the fenestration assembly 100. For example, the frame core 207 shown in FIG. 2 includes a Young's modulus of 7,000,000 psi or the like. Additionally, the frame core 207 has a wall thickness of between 0.06 and 0.150 inches while providing example assembly profiles of 1.0 to 2.0 inches for a direct glaze fenestration assembly, 2.5 to 3.5 inches for a casement fenestration assembly, and 3.5 to 5.0 inches for a door fenestration assembly.

Additionally, and as described herein, the frame core 207 constructed with a polymer and one or more filaments included in the polymer provides a thermal conductivity to the fenestration assembly 100 of approximately 3.0 Btu in/(hr $ft^2$ ° F.) or less. In another example, the thermal conductivity for the fenestration assembly 100 includes a thermal conductivity between 3.0 and 4.0 Btu in/(hr $ft^2$ ° F.) and, in still another example, the fenestration assembly 100 includes a thermal conductivity of approximately 4.0 Btu in/(hr $ft^2$ ° F.). The fenestration assembly 100 (and other examples described herein) achieve these thermal conductivities while at the same time maintaining the modulus elasticity of around 7,000,000 psi or more. In another example, the overall heat transfer coefficient (U) of the overall fenestration assembly 100 with the materials described herein is approximately 0.31 or less and is based on the materials used with the frame core 207 as well as components of the frame core (e.g., narrow core walls, tortuous paths between the interior and exterior, cavities or the like). As described herein, one or more insulation scaffolds are installed within frame cavities of the frame core 207. The insulation scaffolds and the associated scaffold walls and scaffold cavities partition frame cavities and enhance the overall heat transfer coefficient (U value) of the fenestration assembly 200, for instance to U values of less than the 0.31 achieved with the base fenestration assembly 100.

Figure 2:
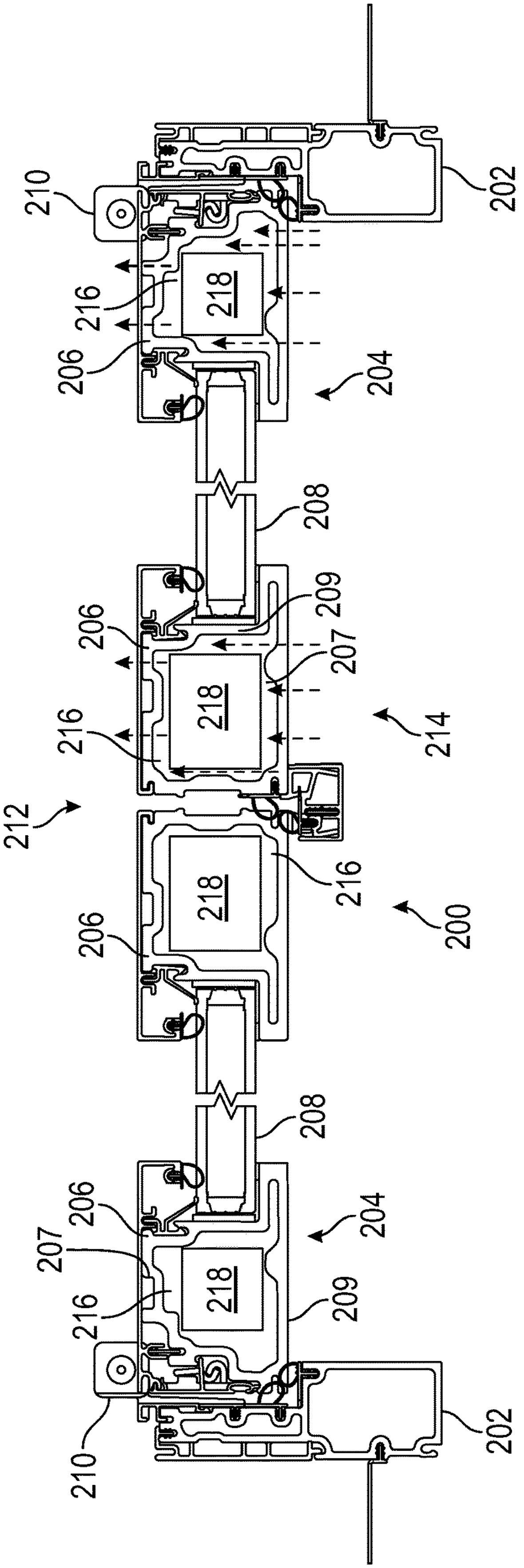
FIG. 2 is a cross sectional view of an example fenestration assembly including at least one frame core.

FIG. 2 is a cross sectional view of one example of a fenestration assembly 200. The fenestration assembly 200 includes one or more components similar to or previously shown in FIGS. 1A, 1B. For instance, the fenestration assembly 200, in this example, includes a fenestration peripheral frame 202, such as a casing, exterior frame or the like configured to receive one or more fenestration panels 204 therein. The fenestration panels 204 shown in FIG. 2 include in-swinging windows, casement windows, doors or the like. In other examples, the fenestration panels include single and double hung sashes, sliding doors, awning sashes or the like. As shown in FIG. 2, the fenestration panels 204 each include fenestration frames 206 also referred to herein as panel frames with glazing units 208 coupled with the fenestration frames 206. The fenestration assembly 200 including the (peripheral) fenestration frame 202 the associated panels 204 include fenestration interiors 212 and fenestration exteriors 214. As described herein, the one or more insulation scaffolds installed within one or more frame cavities of the fenestration assembly 200 are configured to isolate each of the fenestration interior 212 from the fenestration exterior 214 and thereby throttle heat transfer from the interior to the exterior or from the exterior to the interior as described herein.

As further shown in FIG. 2, the fenestration assembly 200, in this example, includes one or more frame cores 207 including lineal frame elements extending into and out of the page. The frame cores 207 each include a core wall 209, in this example, extending continuously between the fenestration interior 212 and the fenestration exterior 214. Accordingly, the frame core 207 and the associated core wall 209 enclose one or more associated frame cavities 216.

In the example shown in FIG. 2, each of the frame cavities 216 of the associated frame cores 207 include insulation blocks 218 installed therein. In one example, the insulation blocks 218 include, but are not limited to, reticulated or unreticulated foam blocks that are installed within the frame cavities 216. As previously discussed herein, the insulation blocks 218 provide insulation to the fenestration assembly 200 and accordingly throttle heat transfer between the fenestration interior and the fenestration exterior 214. As further shown in FIG. 2, for instance, with the dashed arrows indicating heat transfer from the fenestration exterior 214 to the fenestration interior 212, the insulation blocks 218 are profiled to fit within the frame cavities 216 and accordingly provide spacing between the insulation blocks 218 and the associated core walls 209 to facilitate placement in the cavities 216. Heat, such as that shown with the dashed arrows in FIG. 2, is able to transfer around or past the insulation blocks 218, for instance, through open air provided between the fenestration interior 212 and the fenestration exterior 214. Accordingly, the insulation blocks 218, in one example, permit the communication of moving air as well as radiated heat transfer between the fenestration interior and the fenestration exterior 212, 214.

Figure 3:
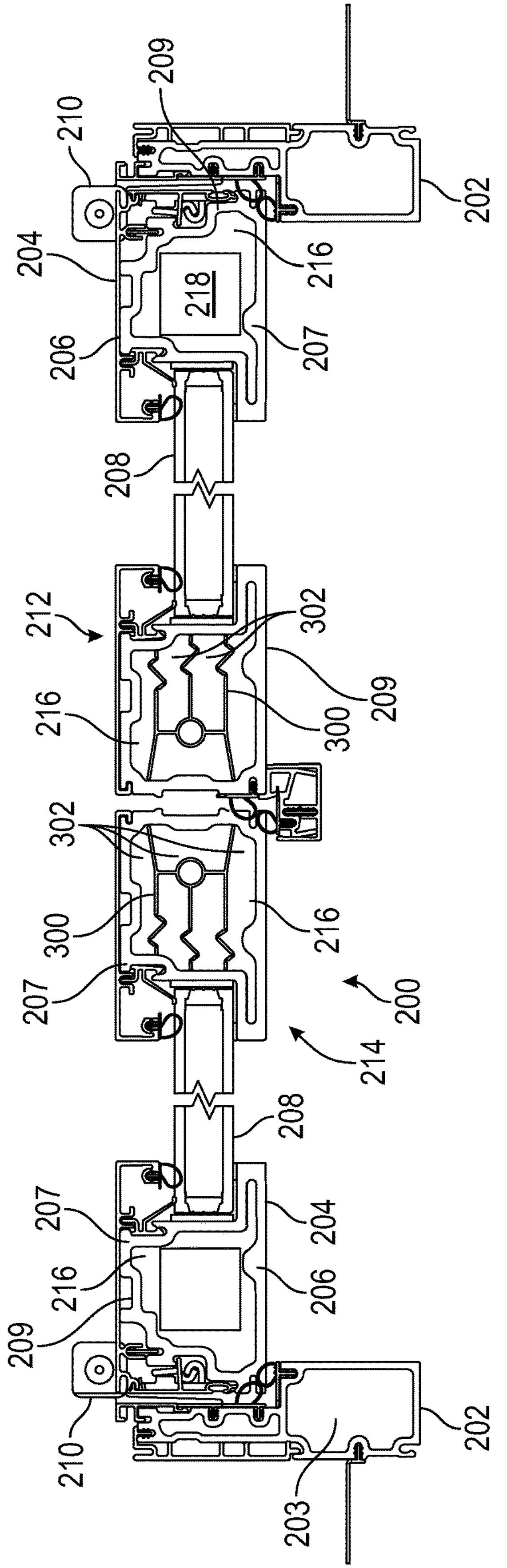
FIG. 3 is a cross sectional view of the fenestration assembly of FIG. 2 including one example of insulation scaffolds.

FIG. 3 is another example of the fenestration assembly 200 previously shown and described in FIG. 2. In this example, the fenestration assembly 200 includes similar components to the fenestration assembly 200 previously shown in FIG. 2. For example, the fenestration assembly 200 includes one or more fenestration frames 202, 206, the associated panels 204 or the like. As further shown in FIG. 3, the fenestration assembly 200 includes frame cores 207 as components of the frames 202, 206. The frame cores 207 are formed, at least in part, with core walls 209 extending continuously between the fenestration interior and the fenestration exterior 212, 214. The core walls 209 include associated frame cavities 216.

As further shown in FIG. 3, the frame cavities 216 of the associated frame cores 207, in this example, include one or more insulation scaffolds 300 positioned therein. The insulation scaffolds 300, as described herein, include one or more scaffold walls and associated scaffold cavities 302. The insulation scaffolds 300 are coupled with the core walls 209 of the associated frame cores 207. For instance, the scaffold walls, scaffolds or the like span the frame cavity 216. In one example as described herein, the scaffold walls include engagement feet configured to engage with the core walls 209 and thereby ensure spanning of the frame cavity 216 with the insulation scaffold 300. The insulation scaffold 300, including the associated wall (or walls) and scaffold cavities 302, divide the frame cavity 216, for instance, into one or more scaffold cavities 302. As shown in FIG. 3, the scaffold cavities 302, in one example, are layered or interposed between the fenestration interior 212 and fenestration exterior 214. The scaffold cavities 302 one or more scaffold walls of the insulation scaffold 300 thereby isolate the fenestration interior from the fenestration exterior 214. The one or more scaffold cavities 302, scaffold walls or the like form separated zones of stagnant air, cavities of stagnant air, and interposing features, such as the scaffold walls or the like interrupt or throttle heat transfer between the interior and exterior 212, 214.

In contrast to the insulation blocks 218 also shown in FIG. 3 and previously shown in FIG. 2, the insulation scaffolds 300 provided in the frame cavities 216 extend across the frame cavities 216 and thereby subdivide the frame cavity 216 into isolated or disconnected cavities such as the scaffold cavities 302. Accordingly, radiative and convective heat transfer between the fenestration interior 212 and the fenestration exterior 214 of the frame cores 207 is thereby minimized (e.g., decreased or eliminated). Instead, the insulation scaffolds 300 having the associated scaffold walls and scaffold cavities 302 interrupt and throttle heat transfer between the interior and exterior 212, 214. Accordingly, the overall insulation characteristic, such as the U-value of the fenestration assembly 200, is improved. In one example, the frame core 207, as previously described herein, by itself provides a coefficient thermal conductivity between 3.0 and 4.0 Btu in/(hr $ft^2$ ° F.). In a similar manner, the associated fenestration assembly 200 provides an overall heat transfer coefficient (U) of approximately 0.31 or less. The inclusion of the insulation scaffold 300 shown, for instance, in FIG. 3 improves one or more associated heat transfer characteristics including, but not limited to, the overall heat transfer coefficient (U) of the fenestration assembly 200 in FIG. 3 relative to the fenestration assembly 200 in FIG. 2 including insulation blocks such as the blocks 218 alone.

Figure 4A:
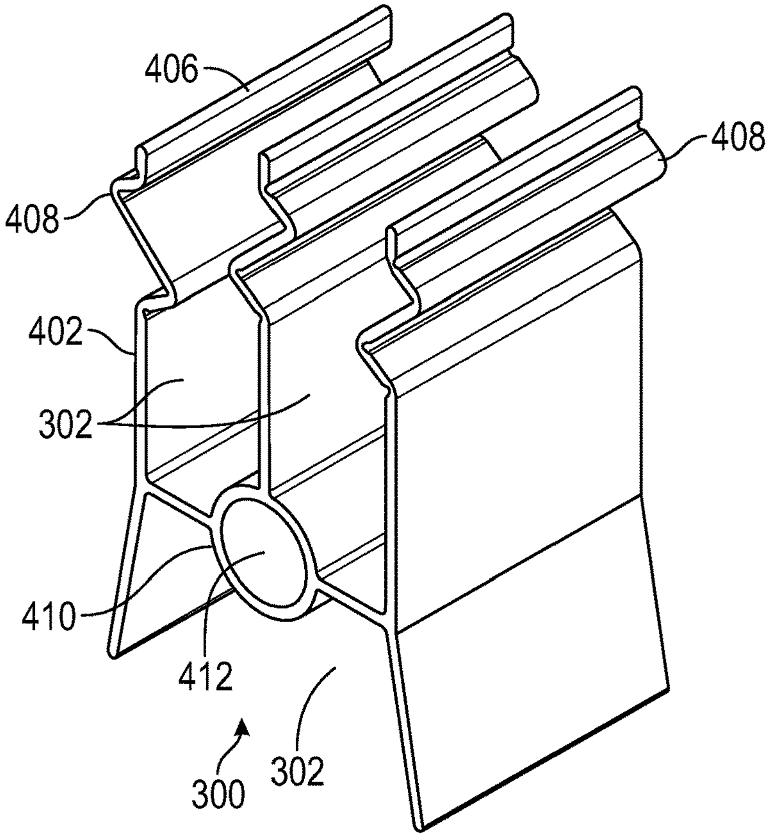
FIG. 4A is a perspective view of an example insulation scaffold.
Figure 4B:
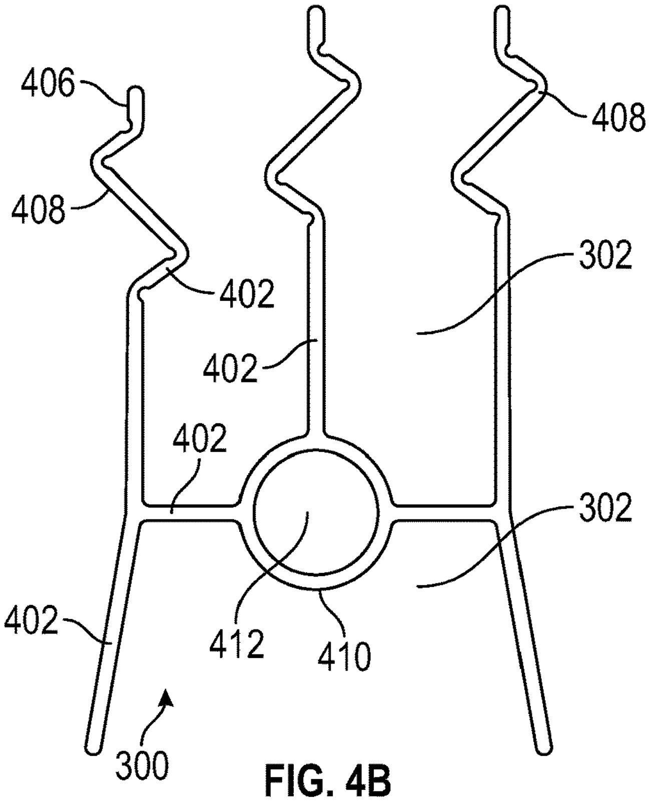
FIG. 4B is an end view of the insulation scaffold of FIG. 4A.

FIGS. 4A, 4B show detailed examples of the insulation scaffold 300 previously shown in FIG. 3. The insulation scaffolds 300 are provided in a shortened view to facilitate illustration and description. The installed version of the insulation scaffold 300, in one example, is a lineal element, for instance, a pultruded or extruded element constructed with, but not limited to, polymers, such as polyvinyl chloride (PVC); extruded or pultruded fiberglass; rigid foam, liquid foam (sprayed, molded, sculpted or machined); or the like and extends into and out of the page as shown in FIG. 3. Optionally, the insulation scaffold 300 is constructed with a pliable material, such as a pliable polymer, that permits deflection of the scaffold 300 for installation and fitting along the frame core 207. In one example, the insulation scaffold 300 has a length commensurate with or corresponding to the length of the associated frame core frame core 207. In another example, the insulation scaffold 300 includes one or more component scaffolds, for instance, installed in a lineal manner (in series) within the frame cavity 216 of the frame core 207.

The insulation scaffold 300 includes one or more of a frame, skeleton, wall assembly or the like and is configured for installation within the frame cavities 216 of the fenestration assembly 200 (see FIG. 3). As previously described, the insulation scaffold 300 divides the associated frame cavities 216 into two or more sub-cavities, for instance, scaffold cavities 302 to thereby throttle heat transfer between the interior and exterior portions such as the fenestration interior 212 and fenestration exterior 214 shown in FIG. 3. As further shown in FIG. 4A, the insulation scaffold 200, in this example, includes one or more scaffold walls 402. The example insulation scaffold 300 includes interconnected scaffold walls 402 that span an associated frame cavity 216 (extend across the cavity 216 to the associated core wall 209) and thereby provide the distinct or isolated scaffold cavities 302. The scaffold walls 402 cooperate with the associated scaffold cavities 302 to throttle convective and radiative heat transfer, for instance, between the interior and exterior portions of the fenestration assembly 200. In some examples, the isolated scaffold cavities 302 are entirely separated from each other. In other examples, the isolated scaffold cavities 302 include incidental interconnections, for instance, to permit limited communication of vapor, facilitate installation of the scaffolds 300 in frame cavities 216 or the like.

As further shown in FIG. 4A and also shown in FIG. 4B, the scaffold cavities 302 are formed with the one or more scaffold walls 402. The scaffold walls 402 subdivide the frame cavity 216 into the scaffold cavities 302. The cavities 302 and interposing walls, such as the scaffold walls 402, throttle heat transfer otherwise caused by convective and radiative heat transfer between portions of the fenestration assembly 200, such as the interior and exterior portions. Instead, the scaffold walls 402 and associated scaffold cavities 302 interrupt airflow and intercept radiated heat to thermally isolate assembly components, such as the interior from the exterior and similarly isolate the exterior from the interior. For instance, as shown in FIG. 3, the scaffold cavities 302 are formed by the scaffold walls 402 extending across the frame cavity 216 and, in one example, are bounded by the scaffold walls 402 themselves as well as the associated or proximate portions of the core wall 209 of the frame core 207. In another example, the insulation scaffold 300 cooperates with the fenestration interior and exterior (e.g., the associated core walls 209 of the frame core 207 along the interior or exterior) to form the scaffold cavities 302 with the insulation scaffold 300 and its associated scaffold walls 402 and thereby provide one or more layers of intervening scaffold cavities 302 between the interior and the exterior 212, 214.

As further shown in FIGS. 4A and 4B, the insulation scaffold 300, in this example, includes one or more engagement feet 406. In the example shown, the engagement feet 406 are provided proximate to one or more ends of the scaffold walls 402. In other examples, the engagement feet 406 are separate components from the scaffold walls 402 and are associated, for instance, with other components of the insulation scaffold 300, for instance, the hardware guide 410, walls surrounding the hardware guide channel 412 or the like. Referring again to FIGS. 4A, 4B, the engagement feet 406, in this example, are configured to engage with one or more corresponding components of the fenestration assembly 200. For instance, as shown in FIG. 3, the engagement feet 406 engage with or couple along the core wall 209.

As shown in FIGS. 4A, 4B, the engagement feet 406 in this example provide a lineal or point contact between the insulation scaffold 300 and the associated core wall 209. Accordingly, conductive heat transfer through the insulation scaffold 300 is minimized by way of the lineal or point contact between the scaffold 300 and the associated components of the core wall 209.

In another example, the insulation scaffold 300, as shown in FIGS. 4A, 4B, includes one or more biasing elements 408 associated with the scaffold 300. The biasing elements 408 provide bias to the insulation scaffold 300 (e.g., the engagement feet 406) to affirmatively engage components of the insulation scaffold 300 with associated components of the core wall 209. In the example shown in FIG. 4A, 4B, the biasing elements 408 are configured to bias the associating engagement feet 406 toward the proximate core wall 209. As shown in FIGS. 4A, 4B, the biasing elements 408, in this example, are living hinges having a serpentine or concertina configuration configured to deflect and provide bias to the engagement feet 406 to ensure secure, affirmative seating of the insulation scaffold 300 within the frame cavity 216 and along the core wall 209.

In another example, one or more of the biasing elements 408, the engagement feet 406 or the feet and biasing element in combination affirmatively aligns one or more channels, guides or other features of the insulation scaffold 300 within the frame cavity 216. For instance, the insulation scaffold 300 includes one or more optional hardware guides 410. One or more of the biasing elements 408, engagement feet 406 or the like aligns the hardware guide 410 as well as its associated guide channel 412 or other features of the insulation scaffold 300 with corresponding features in the fenestration assembly 200. As shown in FIG. 1B, in one example, a connecting rod 114 or shoot bolt 112 extends from the operation hardware 104 to an associated end of the shoot bolts 112 provided proximate to the header and sill of the fenestration panel 108. The shoot bolt 112 (or optional connecting rod 114) is, in one example, received within the guide channel 412 of the hardware guide 410. The hardware guide 410 includes a channel, rail, slot or the like that cooperatively couples with the fenestration hardware component. The hardware guide 410 guides the movement of the hardware component such as the connecting rod 114, shoot bolt 112 or the like along the guide 410 while constraining lateral movement including, but not limited to, one or more of buckling, bending, lateral deformation or the like of the hardware component. In one example, the hardware guide 410 provides support to the hardware component and permits the compressive loading of the hardware component (e.g., with operation of moving components of the fenestration assembly).

Figure 5:
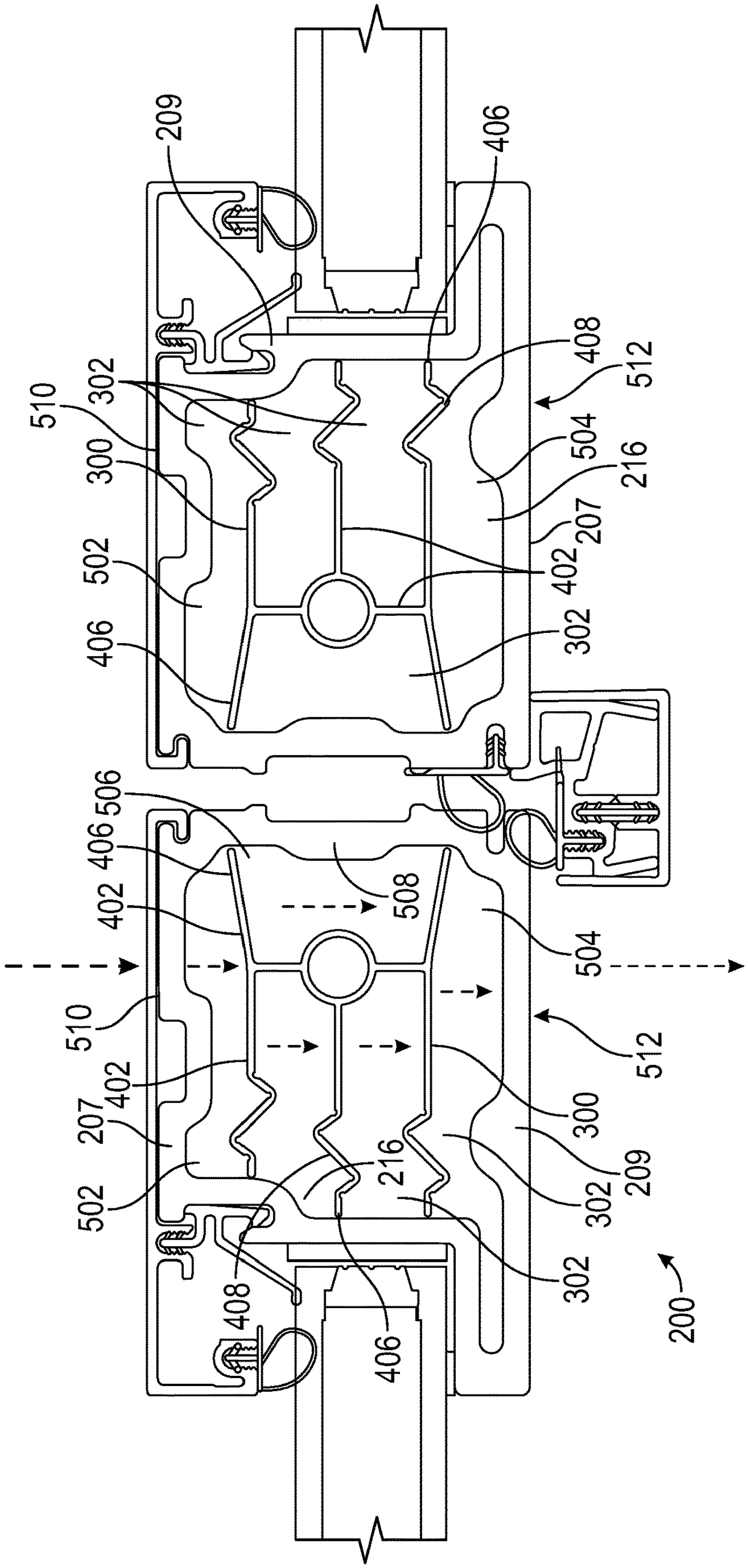
FIG. 5 is a detailed cross sectional view of the fenestration assembly including the insulation scaffolds of FIGS. 4A, 4B.

FIG. 5 is cross-sectional view showing a detailed portion of the fenestration assembly 200 previously shown in FIG. 3. In the example shown in FIG. 5, insulation scaffolds 300 are installed within the frame cores 207. For instance, the scaffolds 300 are positioned within the frame cavities 216 of the frame cores 207. the engagement feet 406 are coupled along corresponding portions of the core wall 209 of each of the frame cores 207. As previously discussed herein, the insulation scaffolds 300 include one or more scaffold walls 402 and one or more scaffold cavities 302. In the example shown in FIG. 5, the scaffold walls 402, in this example, include a plurality of scaffold walls and associated engagement feet 406 coupled along the core wall 209 of the frame core 207. As further shown in the example of FIG. 5, one or more of the scaffold walls 202 include biasing elements 408 of the type previously shown and described in FIGS. 4A, 4B. The biasing elements 408 bias the installed insulation scaffold 300 into affirmative engagement with the associated core wall 209. Accordingly, the scaffold cavities 302 provided by the insulation scaffold 300 subdivide or partition the frame cavity 216 into the isolated scaffold cavities 302 shown.

For example, as shown in FIG. 5, the insulation scaffold 300 and its associated scaffold walls 402 partition the frame cavity 216 into a plurality of scaffold cavities 302. In this example, the scaffold cavities 302 include an interior scaffold cavity 502 proximate to the core interior face 510 of the frame core 207 as well as an exterior scaffold cavity 504 proximate to the core exterior face 512. In this example, the insulation scaffold 300 further includes intervening scaffold cavities 302, for instance, between the interior and exterior scaffold cavities 502, 504 corresponding to the intervening scaffold walls 402.

One example of throttled heat transfer, for instance, one or more of conductive or radiative heat transfer, between the core interior face 510 and the core exterior face 512 is shown with dashed arrows in FIG. 5. In this example, a warmer environment is provided along the core interior face 510, for instance, corresponding to a heated home. Conversely, along the core exterior face 512 a cold environment is provided. Heat transfer begins at the core interior face 510, for instance, in the interior scaffold cavity 502 proximate to the core interior face 510. Heat transfer by way of one or more of radiation, convection or the like is throttled from the core interior face 510 to the core exterior face 512. For instance, scaffold walls 402 and each of the interior and exterior scaffold cavities 502, 504 as well as one or more optional scaffold cavities 302 are interposed between the core interior face 510 and the core exterior face 512. The scaffold cavities 302 (including cavities 502, 504) include stagnant air that insulates the interior from the exterior and conversely the exterior from the interior. Heat transfer is thereby throttled (e.g., minimized or decreased) between the interior face 510 and the exterior face 512 by the intervening scaffold walls 502 and the associated scaffold cavities 302.

As shown in FIG. 5, the scaffold cavities 302 are, in one example, provided in a layered or stacked configuration interposed between the core interior face 510 and the core exterior face 512. The interposing of scaffold cavities 302 between the interior face 510 and the exterior face 512 further minimizes or decreases heat transfer between the interior and exterior and conversely between the exterior and the interior (for instance, during summer months when the exterior environment is heated relative to the interior environment). Heat is instead slowly transferred across multiple walls 402 and between multiple interposed cavities 302 between the interior and exterior faces 510, 512.

As further shown in FIG. 5, the insulation scaffolds 300, in this example, have a profile corresponding to the profile of the frame cavity 216. The frame cavity 216 profile corresponds to the core wall 209 extending around the frame cavity 216 of the frame core 207. For instance, the insulation scaffolds 300 include one or more of engagement feet 406, scaffold walls 402 or the like configured to affirmatively couple the insulation scaffold 300 in the position shown in FIG. 5. As shown, the engagement feet 406 provided along the left and right portions of each of the insulation scaffolds 300 affirmatively engages or couples the insulation scaffold 300 with corresponding portions of the core wall 209. In another example, the core wall 209 of the frame core 207 includes one or more cooperative features such as foot recesses 506, foot ridges 508 or the like configured to receive or seat one or more features of the insulation scaffold

300 (e.g., the engagement feet 406) therein and ensure the specified positioning of the scaffold.

In other examples, the profile of the frame core 207, for instance, the core wall 209 extending around the frame cavity 216 varies according to the differing profile, shapes, sizes or the like of the associated fenestration assembly. In these examples, the insulation scaffold 300 has a complementary or cooperating profile relative to the core wall 209 to facilitate the spanning of the frame cavity 216 by way of the scaffold wails 402 of the insulation scaffold 300 to partition the frame cavity 216 into a plurality of scaffold cavities 302 including, for instance, the interior and exterior scaffold cavities 502, 504. In various examples, the insulation scaffold 300 has one or more differing profiles (including variations of the scaffold by way of shape, size, or the like) to facilitate installation of cooperative insulation scaffolds 300 with corresponding core walls 209 to partition frame cavities 216.

Figure 6:
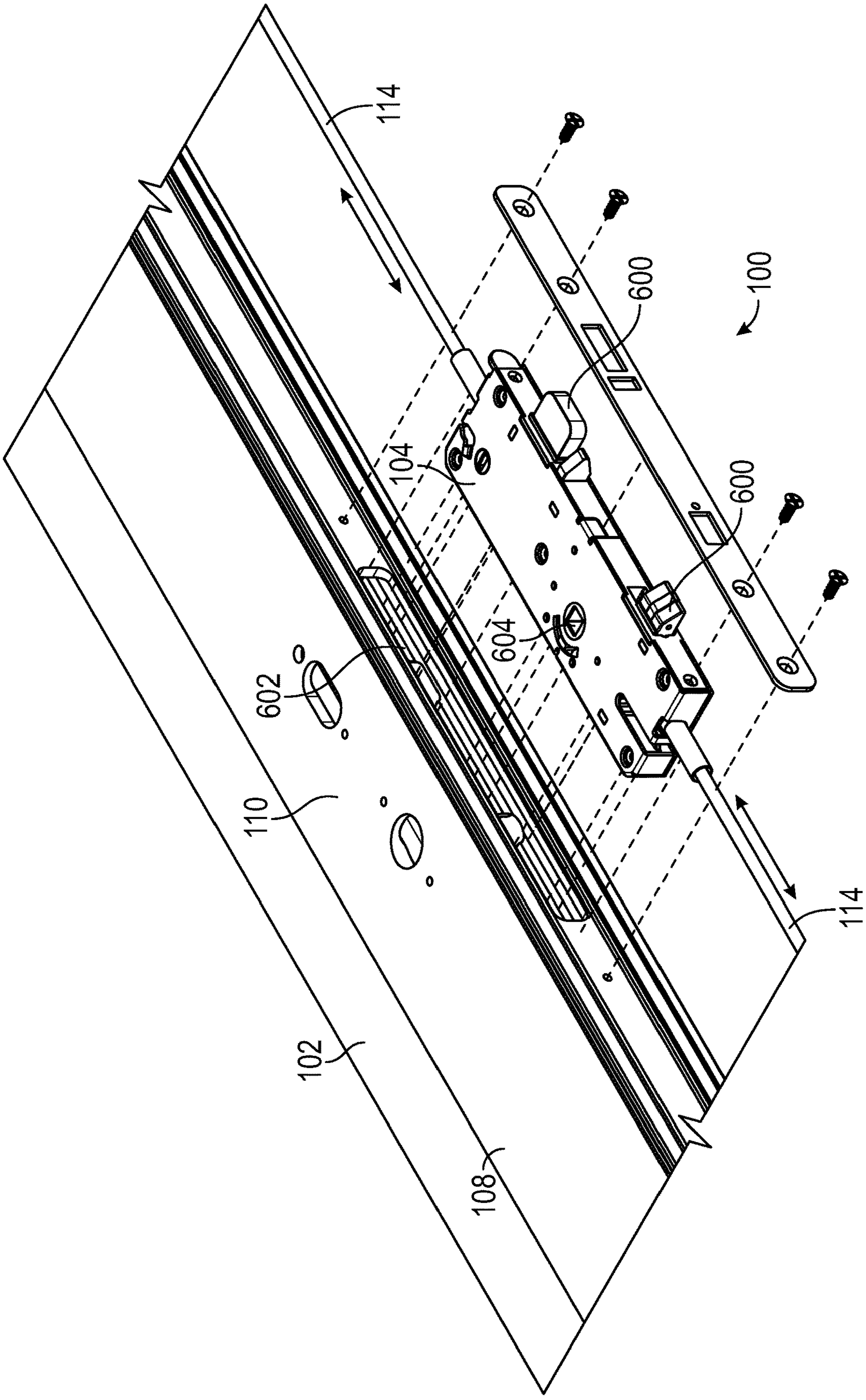
FIG. 6 is an exploded view of a fenestration assembly and one example of operation hardware.

FIG. 6 is a detailed perspective and exploded view of one example of the fenestration assembly 100 previously shown and described in FIGS. 1A, B. As shown, the fenestration assembly 100 includes a fenestration panel 108 such as a door or window sash including a fenestration frame 110 such as a panel frame. A glazing unit 102 is, in one example, coupled or seated within the fenestration frame 110 of the fenestration panel 108.

As previously described, in one example, operation hardware 104 is provided with the fenestration assembly 100. The operation hardware unlocks or locks the fenestration panel 108 for movement relative to one or more other components of the fenestration assembly 100 such as a peripheral fenestration frame including a casing, surrounding frame or the like. The operation hardware 104 is received, in this example, in a hardware recess 602 provided along a portion of the fenestration panel 108 such as along the fenestration frame 110. As further shown in FIG. 6, the operation hardware 104 optionally includes one or more latch bolts 600 configured to permit opening and closing of the fenestration panel 108. A handle interface 604 is included with the operation hardware 104. A handle is coupled at the handle interface 604 and movement of the handle, for instance, by way of rotation moves the latch bolts 600 between deployed and retracted configurations to facilitate locking or permit movement of the fenestration panel 108 from a closed position.

As further shown in FIG. 6, one example of shoot bolts extend from the operation hardware 104 in a manner similarly shown in FIG. 1B. As previously described, the connecting rods 114 are, in one example, examples of shoot bolts, tie bars or the like configured to operate shoot bolt tips such as the shoot bolts 112 shown in FIGS. 1A, 1B. In one example, actuation of the operation hardware 104, for instance, with rotation of a handle at the handle interface 604 operates the connecting rods 114 by translating the connecting rods in one or more directions as shown with arrows in FIG. 6 to accordingly move the shoot bolts 112 from a deployed to a retracted position to facilitate opening and closing of the fenestration panel 108 relative to the remainder of the fenestration assembly 100. In one example, the connecting rods 114 are components of the shoot bolts 112. For instance, the shoot bolts 112 include the connecting rods 114 extending from the shoot bolt tips shown in FIGS. 1A, B to the operation hardware 104.

Referring now to FIGS. 4A, 4B, as previously described, the insulation scaffold 300 includes one or more features including, for instance, hardware guides 410. In the example shown in FIGS. 4A and 4B, the hardware guide 410 includes a guide channel 412. The hardware guide 410 is configured to couple with and support one or more hardware components received therein. In the context of FIG. 6, the hardware guide 410 slidably couples with the connecting rod 114. For instance, the connecting rod 114 is delivered through the hardware guide 410, for instance, along the guide channel 412, between the operation hardware 104 and an upper or lower portion (e.g., the header or sill) of the fenestration panel 108. The hardware guide 410 and its associated guide channel 412 are positioned with the frame cavity such as the frame cavity 216 shown in FIG. 3 and similarly shown in FIG. 5. For instance, the hardware guide 410 and guide channel 412 are positioned within the frame cavity 216 (e.g., by the scaffold walls 402, engagement feet 406, profile of the scaffold or the like) in a manner that aligns the hardware guide 410 and channel 412 with one or more components associated with the operation hardware 104 and shoot bolts 112. The alignment with these components cooperatively aligns the connecting rods 114 with the hardware 104 and shoot bolts 112 (or housing for the shoot bolts 112).

In operation, the hardware guide 410 supports the hardware component such as the connecting rod 114, shoot bolts 112 or the like. For instance, the hardware guide 410 permits translational movement of the hardware component relative to the insulation scaffold 300 and at the same time supports the hardware component while moving. Accordingly, loads such as compressive loads delivered through the connecting rod 114, shoot bolts 112 or the like do not deflect the operation hardware because of the support provided by the hardware guide 410. In one example, the hardware guide 410 including, for instance, the scaffold walls 402 support or constrain lateral movement of the connecting rods 114, shoot bolts 112 or the like and thereby prevent lateral movement such as deflection, deformation, buckling or the like. Instead, the hardware guides 410 constrain lateral movement of the connecting rod 114 and shoot bolts 112 while permitting translation. Lateral movement of the shoot bolts 112, connecting rods 114 or the like is constrained (e.g., limited), for instance, by way of the support provided by the hardware guide 410 surrounding or coupled along a portion of the connecting rod 114 and shoot bolts 112.

In other examples, the hardware guide 410 provides a duct, passage or the like such as the guide channel 412 for reception of one or more other hardware components including, for instance, wiring, wiring harnesses, cables, flexible filaments such as cables, drawstrings, ribbons or the like. The hardware components in various examples facilitate mechanical, electromechanical or electrical operation. For instance, the hardware components include the connecting rods 114 described herein, shoot bolts 112, as well as filaments, cables, ribbons, flexible elements, rods or the like that permit mechanical operation. In other examples, the hardware components including wiring, wiring harnesses, data cables, power cables or the like to control or actuate electrical or electromechanical features of the fenestration assembly, such as sensors, actuators to open or close the assembly, lock or unlock the assembly, monitor conditions of the assembly or proximate to the assembly or the like.

Figure 7:
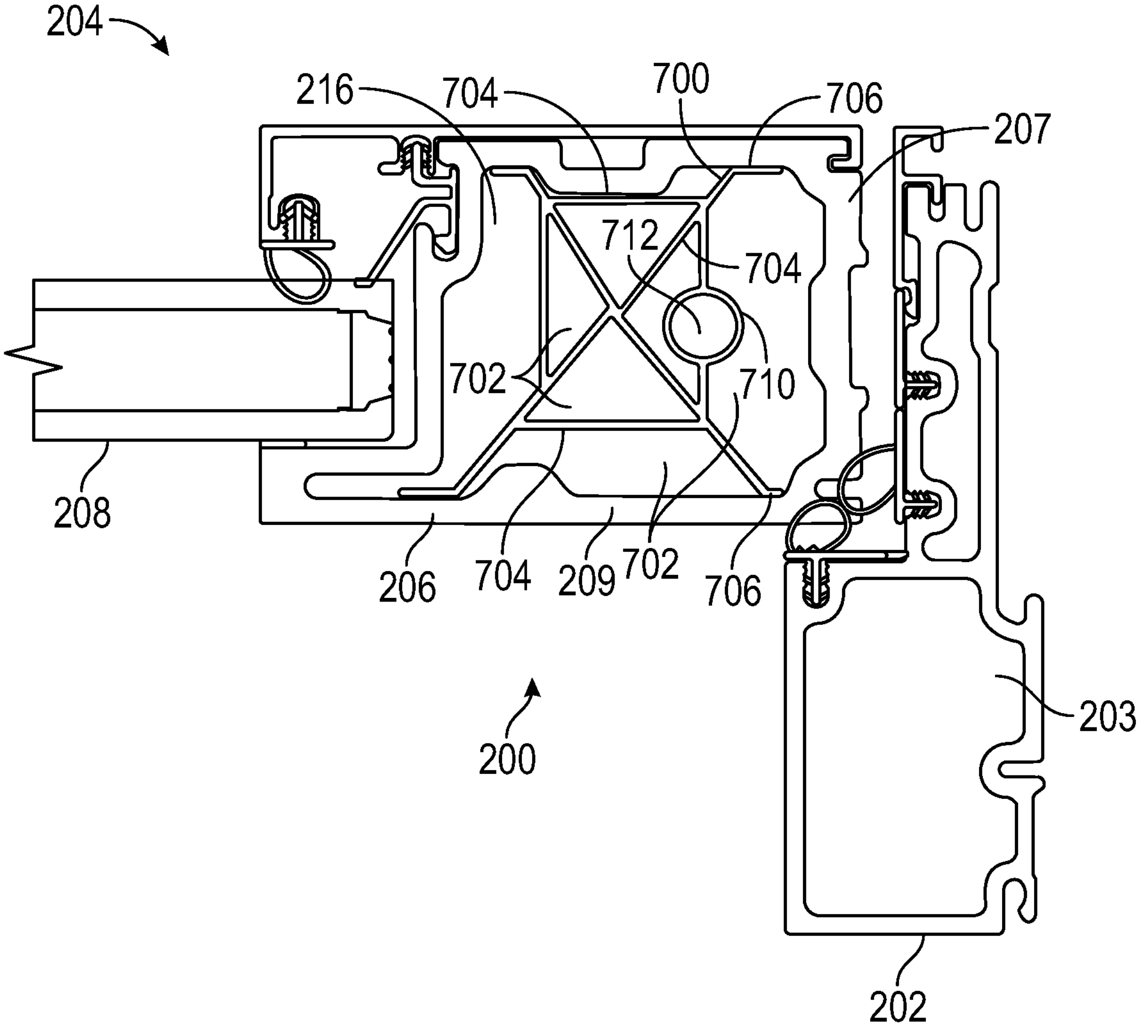
FIG. 7 is a cross sectional view of a fenestration assembly include another example of an insulation scaffold.

FIG. 7 is a sectional view of the fenestration assembly 200 including another example of an insulation scaffold 700. The fenestration assembly 200 includes the fenestration panel 204 having a glazing unit 208 seated within a fenestration frame 206. As previously described, in one example, the fenestration frame 206 includes a frame core extending between interior and exterior portions. For instance, the frame core 207 extends continuously and provides a frame cavity 216 interposed between the interior and exterior portions of the fenestration frame 206. The insulation scaffold 700 is installed within the frame cavity 216.

The insulation scaffold 700 includes at least some features similar to the previously described insulation scaffold 300. For instance, the insulation scaffold 700 includes one or more scaffold walls 704. Optionally, the insulation scaffold 700 includes a plurality of interconnected scaffold walls 704. The one or more scaffold walls 704 provide a series of walls and corresponding scaffold cavities 702 interposed between the interior and exterior portions of the frame core 207. In the example shown in FIG. 7, the one or more scaffold walls 704 extend between the interior and exterior portions of the frame core 207. Scaffold cavities 702 are provided with the insulation scaffold 700. In some examples, the scaffold cavities 702 are entirely bounded by the one or more scaffold walls 704. In other examples, the scaffold cavities 702, for instance, the scaffold cavities to the left or right of the insulation scaffold 700 are proximate to the upper or lower portions of the insulation scaffold 700 (e.g., proximate to the interior and exterior portions of the fenestration assembly 200) and are provided by the scaffold wall 704 in cooperation with the frame core 207, for instance, the core wall 209 extending around the frame cavity 216.

As in previous examples, in the insulation scaffold 700 further includes one or more engagement feet 706 for coupling with or coupling along the frame core 207 to install the insulation scaffold 700 within the frame cavity 216. The engagement feet 706 are, in one example, formed with a complementary profile to the profile of the frame cavity 216. As shown, for instance, in FIG. 7, the engagement feet 706 are provided in a distributed fashion extending from the remainder of the insulation scaffold 700 and engaged with or coupled along corresponding portions of the fenestration frame 206, for instance, along the core wall 209 of the frame core 207. In other examples, additional insulation scaffolds 700, 300 or other variations thereof are provided with different profiles including associated engagement feet, to fit within other frame cavities of the fenestration assembly 200. In one example, the fenestration frame 202, shown in FIG. 7, corresponding to the peripheral frame of the fenestration assembly 200 includes its own frame cavities 203. In one example, one or more insulation scaffolds 700, 300 or the like have a varied profile complementary to the frame cavity 203 to fit within the frame cavity 203 and thereby subdivide or partition the frame cavity 203 into two or more scaffold cavities 702 as previously described with regard to the insulation scaffolds 300, 700 as described herein.

As previously described and shown, for instance, in FIGS. 4A, 4B and 5, the scaffold cavity 702 of the insulation scaffold 300 and the corresponding scaffold cavities of the insulation scaffold 300 are, in one example, layered or provided in a stacked configuration interposed between the interior and exterior portions of the fenestration assembly such as the frame core 207. In a similar manner, the insulation scaffold 700 includes a plurality of scaffold cavities 702. As shown in FIG. 7, at least some of the scaffold cavities 702 are optionally in a layered or intervening configuration relative to the interior and exterior portions of the fenestration assembly 200. For instance, the interior scaffold cavities 702 within the scaffold wall 704 are provided in an interposing fashion relative to the fenestration exterior and interior. In other examples, the lateral scaffold cavities 702, proximate to the core wall 209 and the scaffold wall 704 (e.g., to the left and right of the insulation scaffold 700 in FIG. 7) are interposed between the fenestration interior and exterior portions. Each of the scaffold cavities 702 provides a stagnant air space configured to minimize convective and radiative heat transfer between the interior and exterior portions of the fenestration assembly 200.

As further shown in FIG. 7, the insulation scaffold 700 further includes one or more hardware guides 710. In the example shown, the hardware guide 710 includes a guide channel 712 configured to receive and pass one or more hardware components including, but not limited to, wiring, cables, filaments, connecting rods, shoot bolts or the like. The hardware components are optionally used in cooperation with the operation hardware 104 previously shown and described in FIG. 6.

Figure 8:
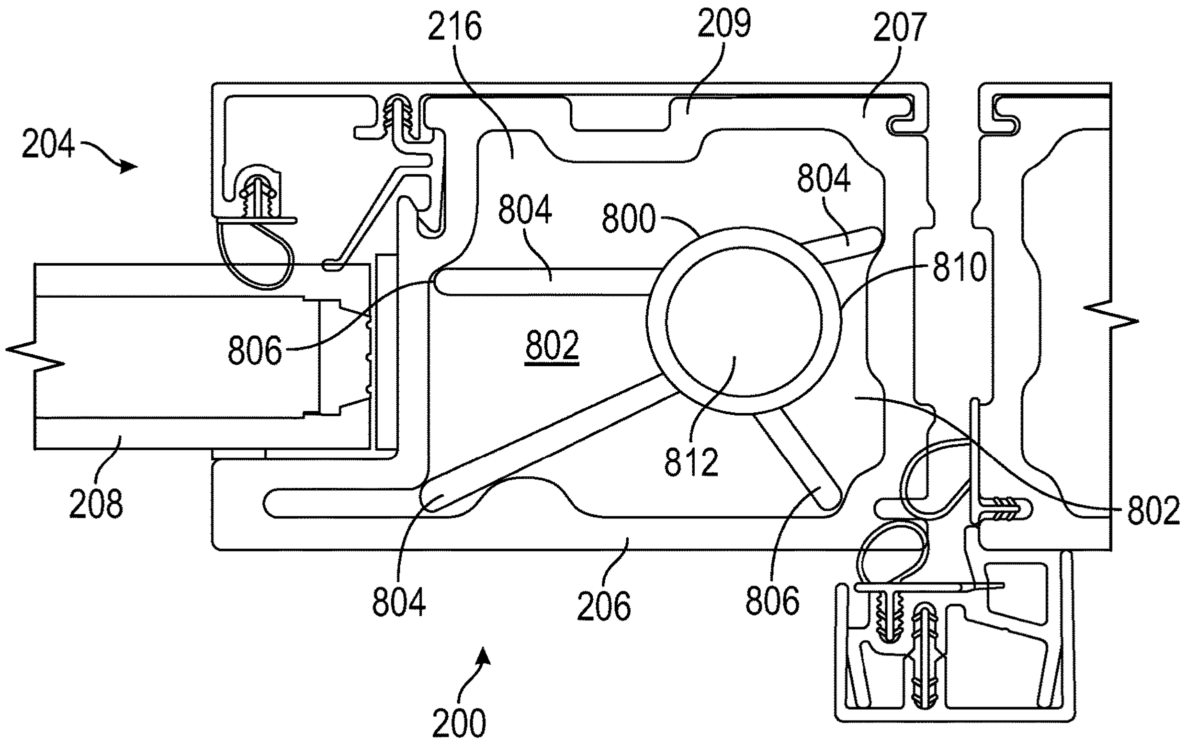
FIG. 8 is a cross sectional view of a fenestration assembly include an additional example of an insulation scaffold.

FIG. 8 is a detailed cross-sectional view of the fenestration assembly 200 including another example of an insulation scaffold 800. The fenestration assembly 200, as shown in FIG. 8, includes similar features to the previously described permutations of the fenestration assembly 200 provided herein. For instance, the assembly 200 includes one or more fenestration panels 204 and each of the fenestration panels 204 includes a fenestration frame 206, such as a panel frame. The fenestration panels 204 are optionally coupled with one or more other components of the fenestration assembly 200, for instance, a peripheral fenestration frame. The fenestration panels 204 are coupled with the peripheral fenestration frame to facilitate one or more of sliding, rotation or translational movement of the fenestration panel 204 relative to the remainder of the fenestration assembly 200, As previously described and further shown in FIG. 8, the fenestration panel 204 includes a fenestration frame 206 and optional glazing unit 208 coupled with the frame 206. The fenestration frame 206 further includes a frame core 207 having a core wall, for instance, constructed with a polymer including one or more filaments such as glass filaments, plastic filaments, wood filaments or the like configured to provide increased thermal mechanical properties to the frame core 207. The frame core 207 includes one or more frame cavities 216 between the interior and exterior portions of the fenestration frame 206.

The insulation scaffold 800, like the various scaffolds described herein, is installed within frame cavities 216 to partition or divide the frame cavities 216 into a plurality of scaffold cavities 802. The insulation scaffold 800, shown in FIG. 8, includes one or more scaffold walls 804 that subdivide the frame cavity 216 into these scaffold cavities 802. As further shown in FIG. 8, the insulation scaffold 800 includes one or more engagement feet 806, and in this example, the engagement feet 806 are coupled with the scaffold walls 804. The engagement feet 806 provide a cooperative engagement, coupling or the like with corresponding features of the frame core 207. For instance, as shown in FIG. 8, the insulation scaffold 800 has a complementary profile to one or more portions of the frame core 207 and the engagement feet 806 couple the scaffold 800 to the frame core 207 to seat the insulation scaffold 800 within the frame cavity 216 and subdivide the frame cavity 216 into the plurality of scaffold cavities 802.

In one example, the engagement feet 806 are by way of their profile (e.g., dimensions, shape, orientation or the like) configured to couple with or engage along corresponding features such as recesses, grooves, ridges or the like of the frame core 207. In other examples, the engagement feet 806, scaffold walls 804 or the like include one or more biasing elements, such as the biasing elements previously described herein, including concertina profiles, living hinges, deflectable or pliable polymer, such as a pliable rubber or the like. The biasing elements are configured to deform and affirmatively engage the insulation scaffold 800 with the frame core 207, for instance to subdivide the frame cavity 216 into distinct scaffold cavities 802.

As with previous insulation scaffold designs, the insulation scaffold 800, shown in FIG. 8, includes a hardware guide 810, for instance having an associated guide channel 812. The hardware guide 810 facilitates the passage of one or more hardware components of the fenestration assembly 200 including, but not limited to, one or more of wiring, cables, movable filaments, connecting rods or the like through the hardware guide 810. In one example, the hardware guide 810 facilitates translational movement of the hardware components through the guide channel 812 or along the guide channel while at the same time constraining lateral movement of the hardware components (e.g., one or more of buckling, bending, deformation, deflection or the like) that may detract or decrease the function of the hardware components.

Figure 9:
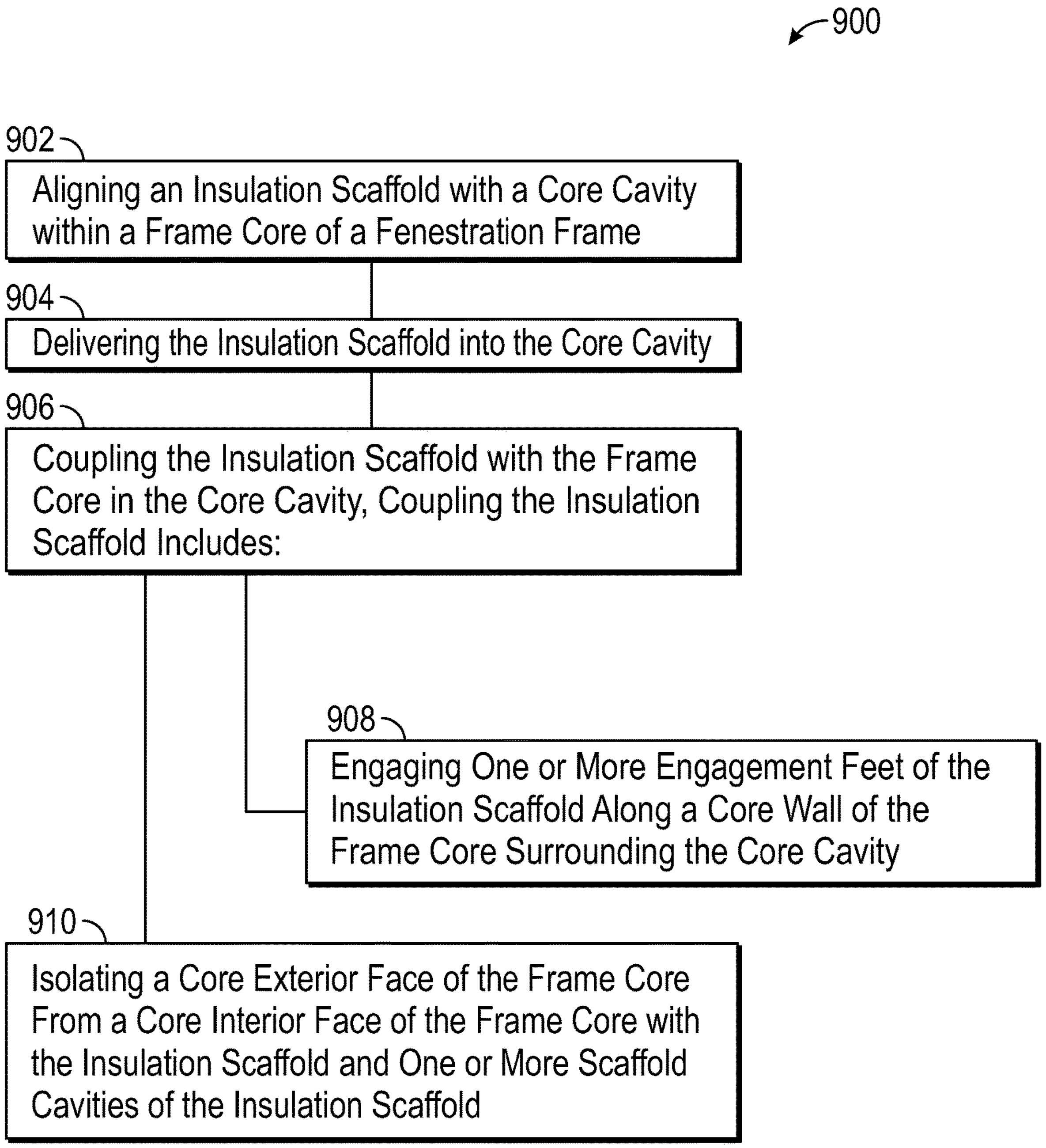
FIG. 9 is a block diagram showing one example of a method of insulating a fenestration assembly.

FIG. 9 shows one example of a method 900 for insulating a fenestration assembly, such as the assemblies 100, 200 shown herein. In describing the method 900, reference is made to one or more components, features, functions, steps or the like previously described herein. Where convenient, reference is made to the components, features, functions, steps or the like with reference numerals. Reference numerals provided are exemplary and are not exclusive. For instance, components, features, functions, steps or the like described in the method 900 include, but are not limited to, corresponding numbered elements provided herein, other corresponding features described herein (both numbered and unnumbered) as well as their equivalents.

At 902 the method 900 includes aligning an insulation scaffold 300 (700, 800, or their equivalents) with a core cavity, such as the frame cavity 216 shown in FIGS. 2 and 3. The frame cavity 216 is optionally provided in a frame core 207, for instance a pultruded or extruded lineal polymer including a filament additive (e.g., glass fibers or the like). The frame core 207 in one example includes a core wall extending continuously between the fenestration interior 212 and exterior 214, for instance the core interior face 510 and core exterior face 512 shown in FIG. 5. The core wall of the frame core 207 extends around the frame cavity 216 and provides the perimeter of the cavity.

At 904, the insulation scaffold 300 is delivered into the core cavity (e.g., the frame cavity 216). The insulation scaffold 300 is optionally a separate component from the frame core 207 and is in one example slidably delivered into the frame cavity 216. The insulation scaffold 300 includes a scaffold profile (e.g., arrangement of feet, shape and size of the scaffold or the like) complementary to a frame core 207 profile, such as the profile of the frame cavity 216.

At 906, the insulation scaffold is coupled with the frame core 207. For example, at 908, one or more engagement feet 406 of the insulation scaffold 300 are coupled along the core wall of the frame core 207 surrounding the frame cavity 216. As provided herein the insulation scaffold 300 and the engagement feet 406 have a complementary profile to the frame cavity 216. With coupling of the insulation scaffold 300 the engagement feet 406 affirmatively couple and position the scaffold 300 with the frame core 207 and the remainder of the fenestration assembly 200. Optionally, one or more biasing elements 408 are included with the insulation scaffold 300. The biasing elements 408 bias the engagement feet 406 and optionally further enhance the coupling of the scaffold 300 with the frame core 207.

At 910 the method 900 includes isolating a core exterior face 512 of the frame core 207 from a core interior face 510 of the frame core with the insulation scaffold 300. For example, the insulation scaffold 300 divides the frame cavity 216 into a plurality of scaffold cavities 302. As described herein, the insulation scaffold 300 (700, 800 or their equivalents) include at least one scaffold wall 402. The at least one scaffold wall 402, with the insulation scaffold 300 installed, divides the frame cavity 216 into one or more scaffold cavities. As described herein, the one or more scaffold cavities 302, scaffold wall 402 partition the frame cavity 216 and throttle heat transfer between the core interior and exterior faces 510, 512. In other examples, the engagement feet 406 couple along the frame core 207 (e.g., the core wall) with one or more of lineal or point contact to minimize surface to surface contact between the scaffold 300 and the frame core 207 and accordingly minimize conductive heat transfer therebetween.

Several options for the method 900 follow. In one example, the one or more scaffold cavities 302 include at least an interior scaffold cavity 502 and an exterior scaffold cavity 504 isolating the core exterior face 512 from the core interior face 510 includes dividing the core cavity (e.g., frame cavity 216) into at least the interior scaffold cavity 502 proximate to the core interior face 510 and the exterior scaffold cavity 504 proximate to the core exterior face 512 with the insulation scaffold 300. In another example, isolating the core exterior face 512 from the core interior face 510 includes dividing the core cavity 216, with the insulation scaffold 300, into a plurality of scaffold cavities 302 layered between the core interior face 510 and the core exterior face 512.

In another example, the method 900 includes slidably installing a hardware component, such as a connecting rod 114, shoot bolt 112, wiring, flexible member or the like, in a hardware guide 410 of the insulation scaffold 300. The hardware guide 410 constrains lateral movement of the hardware component. For example, the hardware guide 410 supports the hardware component laterally, minimizes deflection, buckling or the like, while permitting translation of the component relative to (e.g., along) the hardware guide 410.

Various Notes & Examples

Aspect 1 can include subject matter such as a fenestration assembly comprising: a fenestration frame having a frame core, wherein the frame core includes: a core exterior face proximate an exterior of the fenestration assembly; a core interior face proximate an interior of the fenestration assembly; a core wall including a filament reinforced polymer, and the core wall extends continuously between the core exterior face and the core interior face; and one or more core cavities within the frame core, the one or more core cavities surrounded by the core wall; and at least one insulation scaffold seated within the one or more cavities, the at least one insulation scaffold includes: one or more scaffold walls; scaffold cavities bordered by the one or more scaffold walls; and engagement feet coupled with the remainder of the insulation scaffold, the engagement feet engaged against the core wall within the one or more cavities.

Aspect 2 can include, or can optionally be combined with the subject matter of Aspect 1, to optionally include wherein the engagement feet extend from the one or more scaffold walls.

Aspect 3 can include, or can optionally be combined with the subject matter of one or any combination of Aspects 1 or 2 to optionally include wherein the engagement feet are engaged against the core wall with one or more of point or lineal contact configured to thermally isolate the insulation scaffold from the core exterior face and the core interior face.

Aspect 4 can include, or can optionally be combined with the subject matter of one or any combination of Aspects 1-3 to optionally include wherein the insulation scaffold includes at least one biasing element configured to bias the engagement feet against the core wall.

Aspect 5 can include, or can optionally be combined with the subject matter of one or any combination of Aspects 1-4 to optionally include wherein the insulation scaffold includes a pliable polymer.

Aspect 6 can include, or can optionally be combined with the subject matter of Aspects 1-5 to optionally include wherein the pliable polymer includes polyvinyl chloride (PVC).

Aspect 7 can include, or can optionally be combined with the subject matter of Aspects 1-6 to optionally include wherein two or more scaffold walls of the one or more scaffold walls are layered between the core exterior face and the core interior face, and the scaffold cavities are interposed between two or more of the core exterior face, the scaffold walls or the core interior face.

Aspect 8 can include, or can optionally be combined with the subject matter of Aspects 1-7 to optionally include wherein the scaffold cavities include at least an interior scaffold cavity and an exterior scaffold cavity: the interior scaffold cavity is bordered by the core interior face and the one or more scaffold walls; and the exterior scaffold cavity is bordered by the core exterior face and the one or more scaffold walls.

Aspect 9 can include, or can optionally be combined with the subject matter of Aspects 1-8 to optionally include wherein the one or more scaffold walls and the scaffold cavities are configured to thermally isolate the core exterior face from the core interior face.

Aspect 10 can include, or can optionally be combined with the subject matter of Aspects 1-9 to optionally include wherein the insulation scaffold includes a hardware guide configured to guide and constrain movement of a hardware element within the one or more cavities of the frame core.

Aspect 11 can include, or can optionally be combined with the subject matter of Aspects 1-10 to optionally include wherein the engagement feet engaged against the core wall are configured to align the hardware guide with a hardware component.

Aspect 12 can include, or can optionally be combined with the subject matter of Aspects 1-11 to optionally include wherein the hardware guide includes a guide channel; and comprising a hardware component slidably received in the guide channel, and the hardware guide guides longitudinal sliding movement of the hardware component in the guide channel and constrains lateral movement of the hardware component.

Aspect 13 can include, or can optionally be combined with the subject matter of Aspects 1-12 to optionally include wherein the filament reinforced polymer is a glass filament reinforced polyurethane.

Aspect 14 can include, or can optionally be combined with the subject matter of Aspects 1-13 to optionally include wherein the frame core is one of an extruded or pultruded frame core including the filament reinforced polymer.

Aspect 15 can include, or can optionally be combined with the subject matter of Aspects 1-14 to optionally include a glazing unit seated within the fenestration frame, the glazing unit between the core exterior face and the core interior face.

Aspect 16 can include, or can optionally be combined with the subject matter of Aspects 1-15 to optionally include a fenestration assembly comprising: a fenestration frame having a frame core, wherein the frame core includes: a core exterior face proximate an exterior of the fenestration assembly; a core interior face proximate an interior of the fenestration assembly; a core wall including a filament reinforced polymer, and the core wall extends continuously between the core exterior face and the core interior face; and one or more core cavities within the frame core surrounded by the core wall and between the core interior face and the cores exterior face; and at least one insulation scaffold seated within the one or more cavities, the at least one insulation scaffold includes: one or more scaffold walls; an interior scaffold cavity bordered by the one or more scaffold walls and proximate to the core interior face; an exterior scaffold cavity bordered by the one or more scaffold walls and proximate to the core exterior face; and engagement feet coupled along the core wall.

Aspect 17 can include, or can optionally be combined with the subject matter of Aspects 1-16 to optionally include wherein the engagement feet extend from one or more of the scaffold walls.

Aspect 18 can include, or can optionally be combined with the subject matter of Aspects 1-17 to optionally include wherein the insulation scaffold includes at least one biasing element configured to bias the engagement feet against the core wall.

Aspect 19 can include, or can optionally be combined with the subject matter of Aspects 1-18 to optionally include wherein the insulation scaffold includes a pliable polymer.

Aspect 20 can include, or can optionally be combined with the subject matter of Aspects 1-19 to optionally include wherein the interior scaffold cavity is between the exterior scaffold cavity and the core interior face, and the exterior scaffold cavity is between the interior scaffold cavity and the core exterior face.

Aspect 21 can include, or can optionally be combined with the subject matter of Aspects 1-20 to optionally include wherein interior and exterior scaffold cavities are layered between the core exterior face and the core interior face.

Aspect 22 can include, or can optionally be combined with the subject matter of Aspects 1-21 to optionally include wherein the one or more scaffold walls and the interior and exterior scaffold cavities are configured to thermally isolate the core exterior face from the core interior face.

Aspect 23 can include, or can optionally be combined with the subject matter of Aspects 1-22 to optionally include a method of insulating a fenestration assembly comprising: aligning an insulation scaffold with a core cavity within a frame core of a fenestration frame; delivering the insulation scaffold into the core cavity; coupling the insulation scaffold with the frame core in the core cavity, coupling the insulation scaffold includes: engaging one or more engagement feet of the insulation scaffold along a core wall of the frame core surrounding the core cavity; and isolating a core exterior face of the frame core from a core interior face of the frame core with the insulation scaffold and one or more scaffold cavities of the insulation scaffold.

Aspect 24 can include, or can optionally be combined with the subject matter of Aspects 1-23 to optionally include wherein isolating the core exterior face from the core interior face includes isolating the core exterior face from the core interior face with one or more scaffold walls of the insulation scaffold.

Aspect 25 can include, or can optionally be combined with the subject matter of Aspects 1-24 to optionally include wherein the one or more scaffold cavities include at least an interior scaffold cavity and an exterior scaffold cavity; and isolating the core exterior face from the core interior face includes dividing the core cavity, with the insulation scaffold, into at least the interior scaffold cavity proximate to the core interior face and the exterior scaffold cavity proximate to the core exterior face.

Aspect 26 can include, or can optionally be combined with the subject matter of Aspects 1-25 to optionally include wherein isolating the core exterior face from the core interior face includes dividing the core cavity, with the insulation scaffold, into a plurality of scaffold cavities layered between the core interior face and the core exterior face.

Aspect 27 can include, or can optionally be combined with the subject matter of Aspects 1-26 to optionally include wherein engaging the one or more engagement feet of the insulation scaffold along the core wall includes engaging the one or more engagement feet with one or more of point or lineal contact to the core wall.

Aspect 28 can include, or can optionally be combined with the subject matter of Aspects 1-27 to optionally include wherein engaging the one or more engagement feet of the insulation scaffold along the core wall includes biasing the one or more engagement feet against the core wall with at least one biasing element.

Aspect 29 can include, or can optionally be combined with the subject matter of Aspects 1-28 to optionally include slidably installing a hardware component in a hardware guide of the insulation scaffold; and constraining lateral movement of the hardware component with the hardware guide.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A fenestration assembly comprising:

a fenestration frame having a frame core, wherein the frame core includes:

a core exterior face proximate an exterior of the fenestration assembly;

a core interior face proximate an interior of the fenestration assembly;

a core wall including a filament reinforced polymer, and the core wall extends continuously between the core exterior face and the core interior face; and one or more core cavities within the frame core, the one or more core cavities surrounded by the core wall; and at least one insulation scaffold seated within the one or more core cavities, the at least one insulation scaffold includes:

one or more scaffold walls, each scaffold wall of the one or more scaffold walls is recessed and separated from the core wall or in point contact with the core wall;

vacant scaffold cavities bordered by the one or more scaffold walls; and one or more engagement feet coupled with a remainder of the at least one insulation scaffold, each engagement foot of the one or more engagement feet is in point contact with the core wall.

2. The fenestration assembly of claim 1, wherein the one or more engagement feet extend from the one or more scaffold walls.

3. The fenestration assembly of claim 1, wherein the point contact of each engagement feet includes lineal contact; and wherein the point contact is configured to thermally isolate the at least one insulation scaffold from the core exterior face and the core interior face.

4. The fenestration assembly of claim 1, wherein the at least one insulation scaffold includes at least one biasing element configured to bias the one or more engagement feet against the core wall.

5. The fenestration assembly of claim 1, wherein the at least one insulation scaffold includes a pliable polymer.

6. The fenestration assembly of claim 5, wherein the pliable polymer includes polyvinyl chloride (PVC).

7. The fenestration assembly of claim 1, wherein two or more scaffold walls of the one or more scaffold walls are layered between the core exterior face and the core interior face, and the vacant scaffold cavities are interposed between two or more of the core exterior face, the two or more scaffold walls or the core interior face.

8. The fenestration assembly of claim 1, wherein the vacant scaffold cavities include at least an interior vacant scaffold cavity and an exterior vacant scaffold cavity:

the interior vacant scaffold cavity is bordered by the core interior face and the one or more scaffold walls; and the exterior vacant scaffold cavity is bordered by the core exterior face and the one or more scaffold walls.

9. The fenestration assembly of claim 1, wherein the one or more scaffold walls and the vacant scaffold cavities are configured to thermally isolate the core exterior face from the core interior face.

10. The fenestration assembly of claim 1, wherein the at least one insulation scaffold includes a hardware guide configured to guide and constrain movement of a hardware element within the one or more core cavities of the frame core.

11. The fenestration assembly of claim 10, wherein the one or more engagement feet engaged against the core wall are configured to align the hardware guide with a hardware component.

12. The fenestration assembly of claim 10, wherein the hardware guide includes a guide channel; and comprising a hardware component slidably received in the guide channel, and the hardware guide guides longitudinal sliding movement of the hardware component in the guide channel and constrains lateral movement of the hardware component.

13. The fenestration assembly of claim 1, wherein the filament reinforced polymer is a glass filament reinforced polyurethane.

14. The fenestration assembly of claim 1, wherein the frame core is one of an extruded or pultruded frame core including the filament reinforced polymer.

15. The fenestration assembly of claim 1 comprising a glazing unit seated within the fenestration frame, the glazing unit between the core exterior face and the core interior face.

16. A fenestration assembly comprising:

a fenestration frame having a frame core, wherein the frame core includes:

a core exterior face proximate an exterior of the fenestration assembly;

a core interior face proximate an interior of the fenestration assembly;

a core wall including a filament reinforced polymer, and the core wall extends continuously between the core exterior face and the core interior face; and one or more core cavities within the frame core surrounded by the core wall and between the core interior face and the core exterior face; and at least one insulation scaffold seated within the one or more core cavities, the at least one insulation scaffold includes:

one or more scaffold walls, each scaffold wall of the one or more scaffold walls is recessed and separated from the core wall or in linear contact with the core wall;

an interior vacant scaffold cavity bordered by the one or more scaffold walls and proximate to the core interior face;

an exterior vacant scaffold cavity bordered by the one or more scaffold walls and proximate to the core exterior face; and one or more engagement feet coupled along the core wall, each engagement foot of the one or more engagement feet is in linear contact with the core wall.

17. The fenestration assembly of claim 16, wherein the one or more engagement feet extend from the one or more scaffold walls.

18. The fenestration assembly of claim 16, wherein the at least one insulation scaffold includes at least one biasing element configured to bias the one or more engagement feet against the core wall.

19. The fenestration assembly of claim 16, wherein the at least one insulation scaffold includes a pliable polymer.

20. The fenestration assembly of claim 16, wherein the interior vacant scaffold cavity is between the exterior vacant scaffold cavity and the core interior face, and the exterior vacant scaffold cavity is between the interior vacant scaffold cavity and the core exterior face.

21. The fenestration assembly of claim 16, wherein interior and exterior vacant scaffold cavities are layered between the core exterior face and the core interior face.

22. The fenestration assembly of claim 16, wherein the one or more scaffold walls, the interior vacant scaffold cavity and the exterior vacant scaffold cavity are configured to thermally isolate the core exterior face from the core interior face.

23. A method of insulating a fenestration assembly comprising:

aligning an insulation scaffold with a core cavity within a frame core of a fenestration frame;

delivering the insulation scaffold into the core cavity;

coupling the insulation scaffold with the frame core in the core cavity, coupling the insulation scaffold includes:

engaging one or more engagement feet of the insulation scaffold with one or more of point contact or lineal contact to a core wall of the frame core surrounding the core cavity; and isolating a core exterior face of the frame core from a core interior face of the frame core with the insulation scaffold and one or more vacant scaffold cavities of the insulation scaffold, wherein isolating the core exterior face from the core interior face includes isolating the core exterior face from the core interior face with one or more scaffold walls of the insulation scaffold, each scaffold wall of the one or more scaffold walls is recessed and separated from the core wall, in point contact with the core wall, or in lineal contact with the core wall.

24. The method of claim 23, wherein the one or more vacant scaffold cavities include at least an interior vacant scaffold cavity and an exterior vacant scaffold cavity; and isolating the core exterior face from the core interior face includes dividing the core cavity, with the insulation scaffold, into at least the interior vacant scaffold cavity proximate to the core interior face and the exterior vacant scaffold cavity proximate to the core exterior face.

25. The method of claim 23, wherein isolating the core exterior face from the core interior face includes dividing the core cavity, with the insulation scaffold, into a plurality of vacant scaffold cavities layered between the core interior face and the core exterior face.

26. The method of claim 23, wherein engaging the one or more engagement feet of the insulation scaffold along the core wall includes biasing the one or more engagement feet against the core wall with at least one biasing element.

27. The method of claim 23 comprising:

slidably installing a hardware component in a hardware guide of the insulation scaffold; and constraining lateral movement of the hardware component with the hardware guide.

28. The fenestration assembly of claim 16, wherein the linear contact of each engagement foot includes point contact; and wherein the linear contact is configured to thermally isolate the at least one insulation scaffold from the core exterior face and the core interior face.

* * * * *